United States Patent
Chopdekar et al.

(10) Patent No.: US 7,622,576 B1
(45) Date of Patent: *Nov. 24, 2009

(54) HALIDE-FREE GLUCOSAMINE BASE AND METHOD OF PREPARATION

(75) Inventors: Vilas M. Chopdekar, Edison, NJ (US); Sham N. Redkar, Bound Brook, NJ (US)

(73) Assignee: JFC Technologies, LLC, Bound Brook, NJ (US)

( * ) Notice: Subject to any disclaimer, the term of this patent is extended or adjusted under 35 U.S.C. 154(b) by 691 days.

This patent is subject to a terminal disclaimer.

(21) Appl. No.: 11/223,336

(22) Filed: Sep. 9, 2005

Related U.S. Application Data

(60) Provisional application No. 60/611,709, filed on Sep. 22, 2004.

(51) Int. Cl.
  *C07H 5/04* (2006.01)
  *C07H 5/06* (2006.01)
  *C07H 1/00* (2006.01)
  *A61K 31/70* (2006.01)

(52) U.S. Cl. ............... 536/55.2; 536/55.3; 536/124; 514/62

(58) Field of Classification Search ........... 536/55.2, 536/55.3; 514/62
See application file for complete search history.

(56) References Cited

U.S. PATENT DOCUMENTS

| | | | |
|---|---|---|---|
| 3,683,076 A | 8/1972 | Rovati | 424/180 |
| 4,642,340 A | 2/1987 | Senin et al. | 536/55.2 |
| 5,843,923 A | 12/1998 | Schleck et al. | 514/62 |
| 5,902,801 A * | 5/1999 | Schleck et al. | 514/62 |
| 6,472,380 B1 | 10/2002 | Schleck et al. | 514/62 |
| 6,486,307 B1 | 11/2002 | Gandhi et al. | 536/20 |
| 7,388,000 B1 * | 6/2008 | Redkar et al. | 514/62 |
| 7,388,001 B1 * | 6/2008 | Chopdekar et al. | 514/62 |
| 7,511,134 B1 * | 3/2009 | Redkar et al. | 536/55.2 |
| 2003/0148998 A1 | 8/2003 | Fan et al. | 514/62 |
| 2004/0030121 A1 | 2/2004 | Mukhopadhyay et al. | 536/55.2 |
| 2004/0077055 A1 | 4/2004 | Fosdick et al. | 435/85 |
| 2004/0091976 A1 | 5/2004 | Deng et al. | 435/84 |
| 2005/0014720 A1 | 1/2005 | Vila Pahi et al. | 514/62 |
| 2005/0148545 A1 | 7/2005 | Fosdick et al. | 514/62 |
| 2005/0148546 A1 | 7/2005 | Grund et al. | 514/62 |

FOREIGN PATENT DOCUMENTS

EP  0 214 642 A2  3/1987

* cited by examiner

*Primary Examiner*—Traviss C McIntosh, III
*Assistant Examiner*—Everett White
(74) *Attorney, Agent, or Firm*—Jack Matalon

(57) ABSTRACT

A glucosamine base having a pure level of at least about 99.0 wt. % and a maximum halide content of 0.01 wt. %. The pure glucosamine base is prepared by reacting a glucosamine halide, e.g., glucosamine hydrochloride, with a lithium base in the presence of a $C_1$-$C_4$ alcohol to thereby generate a $C_1$-$C_4$ alcohol solution of a lithium halide and an insoluble halide-free glucosamine base and thereafter separating the insoluble halide-free glucosamine base from the $C_1$-$C_4$ alcohol solution of the lithium halide. Preferably, the lithium base comprises anhydrous lithium hydroxide and the preferable alcohol comprises methanol.

15 Claims, No Drawings

HALIDE-FREE GLUCOSAMINE BASE AND METHOD OF PREPARATION

CROSS-REFERENCE TO RELATED APPLICATION

This application claims the benefit of Provisional Application Ser. No. 60/611,709 filed Sep. 22, 2004.

FIELD OF THE INVENTION

The invention relates to a halide-free glucosamine base and a method for converting a glucosamine halide into a halide-free glucosamine base.

BACKGROUND OF THE INVENTION

Glucosamine is a well-known amino monosaccharide found in chitin, glycoproteins and glycosaminoglycans. Glucosamine is widely used for the treatment of rheumatic fever, arthritic and arthosic complaints, in the acute as well as chronic forms, as well as in the treatment of pathological conditions originating from metabolic disorders of the osteoarticular tissue. Although products in the marketplace are labeled as, or referred to as, "glucosamine", they are misnomers since such products consist of glucosamine hydrochloride or as unreacted mixtures of glucosamine hydrochloride and a salt such as potassium or sodium sulfate.

Mixed salts of glucosamine hydrochloride and alkaline or earth alkaline metal sulfates such as potassium sulfate, and sodium sulfate are well known. Such mixed salts are used rather than glucosamine sulfate alone since the latter is unstable in view of its highly hygroscopic nature and the facility with which its amino group oxidizes if not completely saltified, see, e.g., U.S. Pat. No. 4,642,340 and U.S. Pat. No. 3,683,076 which disclose mixtures of glucosamine sulfate and glucosamine hydroiodide.

In EP 0 214 642, five glucosamine base containing residual chloride is converted to a mixed salt of glucosamine sulfate and potassium chloride by dissolving the glucosamine base in water, adding a stoichiometric quantity of concentrated sulfuric acid to form a solution of glucosamine sulfate in water and dissolving a stoichiometric amount of potassium chloride in the solution. The mixed salt is precipitated from the solution by addition of a precipitant such as isopropanol, stirring the mixture for about 14 hours to complete the precipitation, cooling the reaction mass to 0° C. and recovering the precipitated salt by filtration. This process results in low yields.

Free glucosamine base may be prepared by the method recited in *Chem. Ber.*, volume 75, page 1274. Such method involves the treatment of glucosamine hydrochloride with an ethanolic solution of a tertiary base such as triethylamine. Triethylamine hydrochloride is filtered off and the free glucosamine is then recovered from the reaction mixture. However, triethylamine is a toxic material even in small quantities and the yield of the free glucosamine base is quite low. Moreover, the free glucosamine base still contains residual chloride.

Free glucosamine base may also be prepared by microbial fermentation. For example, see U.S. Published Patent Application Publication Nos. 2004/0091976 A1, 2004/0077055 A1 and 2003/0148998 A1. It is known to prepare glucosamine by deacetylation of n-acetylglucosamine, see U.S. Published Patent Application Publication No. 2005/0145846 A1. Glucosamine hydrochloride may also be prepared by the process disclosed in U.S. Pat. No. 6,486,307; the process involves the grinding of chitin to a very fine size, followed by digestion with concentrated hydrochloric acid. The crude glucosamine hydrochloride is then decolorized with activated charcoal and assayed by pH titration with a base.

In U.S. Published Patent Application 2004/0030121, free glucosamine base containing residual chloride is converted to glucosamine sulfate and potassium chloride by dissolving the glucosamine base in water, adding a stoichiometric quantity of concentrated sulfuric acid to form a solution of glucosamine sulfate in water and dissolving a stoichiometric amount of potassium chloride in the solution. The mixed salt is precipitated from the solution by addition of a precipitant such as isopropanol, stirring the mixture for about 14 hours to complete the precipitation, cooling the reaction mass to 0° C. and recovering the precipitated salt by filtration. This process results in low yields.

Regardless of the source of the glucosamine, it is commercially available only in the form of a halide salt, usually the hydrochloride, since the glucosamine free base can only be isolated from aqueous reaction mixtures in the form of its salt. Furthermore, free glucosamine base is unstable at ambient temperatures and is quite hygroscopic and it is therefore converted to a halide salt before being marketed.

It would be most desirable if a method could be found for converting a glucosamine halide into a halide-free glucosamine base. The resultant halide-free glucosamine base could then be used as is for those medicinal purposes in which the presence of a salt such as sodium or potassium chloride, sodium or potassium sulfate, sodium or potassium iodide, etc. is undesirable. The halide-free glucosamine base may also be employed to prepare a wide variety of useful derivatives such as glucosamine salts, e.g., glucosamine sulfate, glucosamine phosphate, glucosamine salts of α-hydroxy acids (e.g., lactic acid, citric acid, etc.), n-acetylglucosamine, glucosamine salts of drugs having acidic functionalities, etc., wherein such derivatives and salts do not contain any objectionable cations such as sodium or potassium.

DETAILS OF THE INVENTION

The invention relates to a very pure halide-free glucosamine base and a method for preparing such base by the conversion of a glucosamine halide salt into the halide-free glucosamine base with very high yields. The method involves the following steps:

(a) a glucosamine halide (e.g., glucosamine hydrochloride, glucosamine hydroiodide, etc.) is located with a lithium base in the presence of a $C_1$-$C_4$ alcohol to thereby generate a $C_1$-$C_4$ alcohol solution of a lithium halide and an insoluble halide-free glucosamine base; and (b) the insoluble halide-free glucosamine base is separated from the $C_1$-$C_4$ alcohol solution of the lithium halide salt.

For maximum yields, the reaction should be carried out at a temperature of about 15 to about 35° C. conveniently, the reaction may be carried out at ambient temperatures.

The $C_1$-$C_4$ alcohol may be, e.g., methanol, ethanol (preferably anhydrous), isopropanol, etc.; the preferred alcohol comprises methanol. The lithium base may be anhydrous lithium hydroxide, lithium hydroxide monohydrate, lithium methoxide, lithium ethoxide or lithium isopropoxide. The preferred lithium base comprises anhydrous lithium hydroxide. It has been found that the presence of water in the reaction mixture reduces the yield of the halide-free glucosamine base. Accordingly, it is preferred that the reaction be carried out under anhydrous conditions. In general, the lithium base is employed in an amount of about 1.0 to about 1.2 moles per mole of halide present in the glucosamine halide salt. Excess lithium base is unnecessarily wasteful and will reduce the yield of the halide-free glucosamine base. Typically, the alcohol is employed in an amount of about 1 to about 10 parts, preferably 3 to 6 parts, per part of lithium base.

After allowing the reaction between the glucosamine halide and the lithium base to proceed (preferably with stirring) for about 5 minutes to about 2 hours, the solid halide-free glucosamine base is filtered off from the resultant alcohol solution of the lithium halide and the base is washed with additional alcohol. The halide-free glucosamine base may then be dried under vacuum at a temperature of about 15 to about 30° C. The yield typically ranges from about 85 to about 90%.

The halide-free glucosamine base is very pure. It will have a purity level of at least about 99.0 wt. %. For the purposes of this invention, the term "halide-free" means that the halide content will be a maximum of about 0.01 wt. %, e.g., 100 ppm or less and very often, the halide content will be less than 50 ppm and as low as 25 ppm. Based upon the residual halide content of the halide-free glucosamine base, the lithium residue in the glucosamine base will generally be a maximum of about 20 ppm and very often, the lithium residue content will be less than 10 ppm.

The halide-free glucosamine base of the invention is not stable at ambient temperatures and/or when exposed to the atmosphere. Accordingly, the halide-free glucosamine base should be kept refrigerated in a closed container or stabilized by other means, e.g., by coating the halide-free glucosamine base with an appropriate polymer, preferably a pharmaceutically acceptable water-soluble, water-dispersible or water-swellable polymer.

The prior art teaches that sodium methoxide or sodium hydroxide may be used to remove chloride from glucosamine hydrochloride. However, the by-product sodium chloride is insoluble in a lower alcohol such as methanol and the glucosamine base is also insoluble in methanol. Therefore, the glucosamine base cannot be separated from the by-product sodium chloride. However, when lithium hydroxide is used as the base, the glucosamine base product is insoluble in methanol whereas the by-product lithium chloride is very soluble in methanol, thus facilitating the separation of the glucosamine base product from the lithium chloride by-product.

Not only are the glucosamine compositions of the invention free of halide, but they are also free of the salts that are present in currently available "glucosamine" compositions. Thus a patient who cannot or who does not wish to ingest salts when ingesting currently available "glucosamine" may now be able to ingest true glucosamine containing neither extraneous cations nor anions.

The following nonlimiting examples shall serve to illustrate the preferred embodiments of the invention. Unless otherwise indicated, all parts and percentages are on a weight basis.

EXAMPLE 1

For the purposes of comparison, an attempt was made to convert glucosamine hydrochloride into chloride-free glucosamine base using triethylamine. 52 g (0.51 m) of triethylamine together with 300 ml methanol and 30 ml water were stirred and cooled to 15-20° C. Thereafter 100 g (0.46 m) of glucosamine hydrochloride were slowly added, with stirring. The reaction mixture was stirred for one hour and then warmed, while stirring for 30 minutes to 30-40° C. The reaction mixture was filtered and washed with two 100 ml portions of methanol. The net weight of the glucosamine base was 110 g. A test of a sample of the glucosamine base with 0.1 N silver nitrate solution was positive, indicating the presence of chloride in the glucosamine base.

The glucosamine base was stirred with 300 ml of methanol at 50-60° C. for 30 minutes, filtered and the solid was washed with two 50 ml portions of methanol. The yield was 80 g and the glucosamine base had a melting point of 100-105° C. A test of a sample of this glucosamine base with 0.1 N silver nitrate solution was again positive, indicating that chloride remained in the glucosamine base.

For the purposes of further comparisons, the example set forth above was repeated using (a) aqueous ammonia, (b) sodium hydroxide, (c) calcium hydroxide and (d) sodium methoxide. In all cases, the yield of glucosamine base was very poor and further, testing with silver nitrate solution was positive, indicating that the glucosamine base contained chloride.

EXAMPLE 2

107.8 g (0.5 m) of glucosamine hydrochloride was placed in a reaction vessel together with 350 ml of methanol and stirred for 15 minutes to obtain a slurry. Thereafter, 25.2 g (0.525 m) of anhydrous lithium hydroxide was added in a single portion, while stirring (the lithium hydroxide was insoluble in the methanol). The reaction mixture was stirred for 30 minutes. It was noted that the lithium hydroxide gradually went into solution and the temperature rose to 28-30° C. The reaction mixture was stirred for an additional two hours and then cooled to 18° C. in an ice bath. The solid was filtered off, washed with 150 ml of methanol and sucked dry and thereafter dried under vacuum at 30° C. for four hours. The glucosamine base product weighed 79 g (88% yield) and had a melting point of 109-110° C.. One gram of the product was dissolved in 20 ml of purified water to which 5 ml of 0.1 N silver nitrate were added. No precipitate resulted, indicating that the glucosamine base product was chloride-free.

EXAMPLE 3

In a reaction vessel were charged 215.6 g (1 m) of glucosamine hydrochloride and 700 ml of methanol. The reaction mixture was stirred for 15 minutes (the glucosamine hydrochloride was insoluble in the methanol) and thereafter, 44.1 g (1.05 m) of lithium hydroxide monohydrate were added, with stirring, over a period of 10 minutes at 25° C. The temperature rose to 31° C. and, after 20 minutes of stirring, a clear solution resulted at 29° C. Stirring was continued at 28-30° C. for a period of two hours and the product slowly precipitated out of the reaction mixture. The reaction mixture was chilled to 15-16° C., and the product was filtered off and washed with 200 ml of methanol. The product was sucked dry and was thereafter vacuum dried at 30° C. for 4 hours. The yield of the glucosamine product was 151 g (84.3%) and its melting point was 109-110° C. One gram of the product was dissolved in 20 ml of purified water to which 5 ml of 0.1 N silver nitrate were added. No precipitate resulted, indicating that the glucosamine base product was chloride-free.

What is claimed is:

1. A glucosamine base having a purity level of at least 99.0 wt. % and a maximum halide content of about 0.01 wt. %.

2. The glucosamine base of claim 1 wherein the halide content is less than 100 ppm.

3. The glucosamine base of claim 2 wherein the halide content is less than 50 ppm.

4. The glucosamine base of claim 1 wherein the base contains lithium residues in a maximum amount of about 20 ppm.

5. The glucosamine base of claim 4 wherein the glucosamine base contains lithium residues in an amount of less than 10 ppm.

6. A method for preparing a halide-free glucosamine base consisting essentially of:
(a) reacting a glucosamine halide with a lithium base in the presence of a $C_1$-$C_4$ alcohol to thereby generate a $C_1$-$C_4$ alcohol solution of a lithium halide and an insoluble halide-free glucosamine base; and
(b) separating the insoluble halide-free glucosamine base from the $C_1$-$C_4$ alcohol solution of the lithium halide.

7. The method of claim 6 wherein the glucosamine halide comprises glucosamine hydrochloride.

8. The method of claim 6 wherein the lithium base is selected from the group consisting of anhydrous lithium hydroxide, lithium hydroxide monohydrate, lithium methoxide, lithium ethoxide and lithium isopropoxide.

9. The method of claim 8 wherein the lithium base comprises anhydrous lithium hydroxide.

10. The method of claim 8 wherein the alcohol comprises methanol.

11. The method of claim 8 wherein the reaction is carried out at a temperature of about 15 to about 35° C.

12. The method of claim 8 wherein the lithium base is employed in an amount of about 1.0 to about 1.2 moles per mole of halide present in the glucosamine halide.

13. The method of claim 8 wherein the separated halide-free glucosamine base is dried under vacuum at a temperature of about 15 to about 30° C.

14. The method of claim 8 wherein the alcohol is employed in an amount of about 1 to about 10 parts per part of the lithium base.

15. The method of claim 14 wherein the alcohol is employed in an amount of 3 to 6 parts per part of lithium base.

* * * * *